United States Patent
Vive et al.

(10) Patent No.: US 12,304,645 B2
(45) Date of Patent: May 20, 2025

(54) HYBRID PROPULSION SYSTEM AND METHOD FOR CONTROLLING SUCH A SYSTEM

(71) Applicant: SAFRAN HELICOPTER ENGINES, Bordes (FR)

(72) Inventors: Lois Pierre Denis Vive, Moissy-Cramayel (FR); Thomas Klonowski, Moissy-Cramayel (FR); Camel Serghine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 324 days.

(21) Appl. No.: 17/601,816

(22) PCT Filed: Apr. 10, 2020

(86) PCT No.: PCT/FR2020/000116
§ 371 (c)(1),
(2) Date: Oct. 6, 2021

(87) PCT Pub. No.: WO2020/212656
PCT Pub. Date: Oct. 22, 2020

(65) Prior Publication Data
US 2022/0177147 A1 Jun. 9, 2022

(30) Foreign Application Priority Data
Apr. 16, 2019 (FR) .................................. 1904034

(51) Int. Cl.
*H02J 3/36* (2006.01)
*B64C 27/08* (2023.01)
(Continued)

(52) U.S. Cl.
CPC ............. *B64D 27/24* (2013.01); *B64C 27/08* (2013.01); *H02J 3/36* (2013.01); *B64D 27/026* (2024.01);
(Continued)

(58) Field of Classification Search
None
See application file for complete search history.

(56) References Cited

U.S. PATENT DOCUMENTS 6,404,163 B1 * 6/2002 Kapsokavathis ... H02J 7/00302
320/104
2007/0170724 A1 7/2007 Calley
(Continued)

FOREIGN PATENT DOCUMENTS

AU 2009200048 A1 7/2009
CA 3038299 A1 4/2018
(Continued)

OTHER PUBLICATIONS

"What is a Snubber? How to Use a Snubber & Types." Arrow.com, Oct. 19, 2016, www.arrow.com/en/research-and-events/articles/what-is-a-snubber#:~:text=A%20snubber%20is%20a%20device,in%20voltage%20across%20t (Year: 2016).*
(Continued)

*Primary Examiner* — Joshua J Michener
*Assistant Examiner* — Ka Chun Leung
(74) *Attorney, Agent, or Firm* — WOMBLE BOND DICKINSON (US) LLP

(57) ABSTRACT

A hybrid propulsion system for a multi-rotor rotary-wing aircraft, including: an internal combustion engine, an electric machine coupled to the internal combustion engine, a rectifier connected to the electric machine, a converter, an electric network connecting the rectifier to the converter, electric motors connected to the converter, rotary-blade
(Continued)

assemblies coupled to the electric motors, wherein the system includes: a detector configured to detect a reduction in a demand for electrical power within the system to below a predetermined value, a bypass circuit configured to bypass the electric machine when the detector detects a reduction in the demand for electrical power.

14 Claims, 3 Drawing Sheets

(51) Int. Cl.
  *B64D 27/02* (2006.01)
  *B64D 27/24* (2024.01)
(52) U.S. Cl.
  CPC ....... *B64D 2221/00* (2013.01); *H02J 2310/44* (2020.01)

(56) References Cited

U.S. PATENT DOCUMENTS

| | | | |
|---|---|---|---|
| 2014/0070742 A1 | 3/2014 | Schulz | |
| 2020/0115062 A1 | 4/2020 | Klonowski et al. | |
| 2020/0290742 A1* | 9/2020 | Kumar | B64D 27/24 |

FOREIGN PATENT DOCUMENTS

| | | | | |
|---|---|---|---|---|
| CN | 101519116 A | | 9/2009 | |
| CN | 101600882 A | | 12/2009 | |
| CN | 102889181 A | | 1/2013 | |
| CN | 103684204 A | | 3/2014 | |
| CN | 104791192 A | | 7/2015 | |
| CN | 106877478 | * | 6/2017 | |
| DE | 102006045731 A1 | * | 4/2008 | B60K 6/365 |
| EP | 0556593 A1 | | 8/1993 | |
| FR | 3056555 A1 | | 3/2018 | |
| JP | 2003-189697 A | | 7/2003 | |
| KR | 20080001344 U | | 5/2008 | |
| WO | 03/106828 A2 | | 12/2003 | |
| WO | 2013/064928 A1 | | 5/2013 | |
| WO | WO-2018060591 A1 | * | 4/2018 | B64C 27/08 |

OTHER PUBLICATIONS

"Electronic Circuit." Wikipedia, Mar. 28, 2019, en.wikipedia.org/w/index.php?title=Electronic_circuit&oldid=889855889 (Year: 2019).*

"Electrical Devices Vs Electronic Devices—What's the Difference?" Electronic Products, Jun. 6, 2016, www.electronicproducts.com/electrical-devices-vs-electronic-devices-whats-the-difference/ (Year: 2016).*

"Calculating Demand Values." Schneider Electric, Jun. 2024, www.productinfo.schneider-electric.com/micrologicxuserguide/doca0102-micrologic-x/English/BM_MasterPact%20MTZ%20MicroLogic%20X_b5effd44_T001599214.xml/$/TPC_CalculatingDemandValues_b5effd44_T001599573. (Year: 2024).*

"MasterPact MTZ MicroLogic X Control Unit User Guide." Schneider Electric, Jul. 2020, available at https://www1.lk.dk/flipbooks/6.3.6MasterPact_MTZ_MicroLogic_X_Control_Unit_-_User_Guide/content/DOCA0102EN-06.pdf (Year: 2020).*

International Search Report and Written Opinion received for PCT Application No. PCTFR2020/000116 mailed Jul. 9, 2020, 13 pages (7 pages of English Translation and 10 pages of original document).

International Preliminary Report on Patentability received for PCT Patent Application No. PCT/FR2020/000116, mailed on Oct. 28, 2021, 15 pages (7 pages of English Translation and 8 pages of Original Document).

Office Action received for Chinese Patent Application No. 202080031843.1, mailed on Feb. 29, 2024, 13 pages (4 pages of English Translation and 7 pages of Original Document).

* cited by examiner

[Fig. 1]
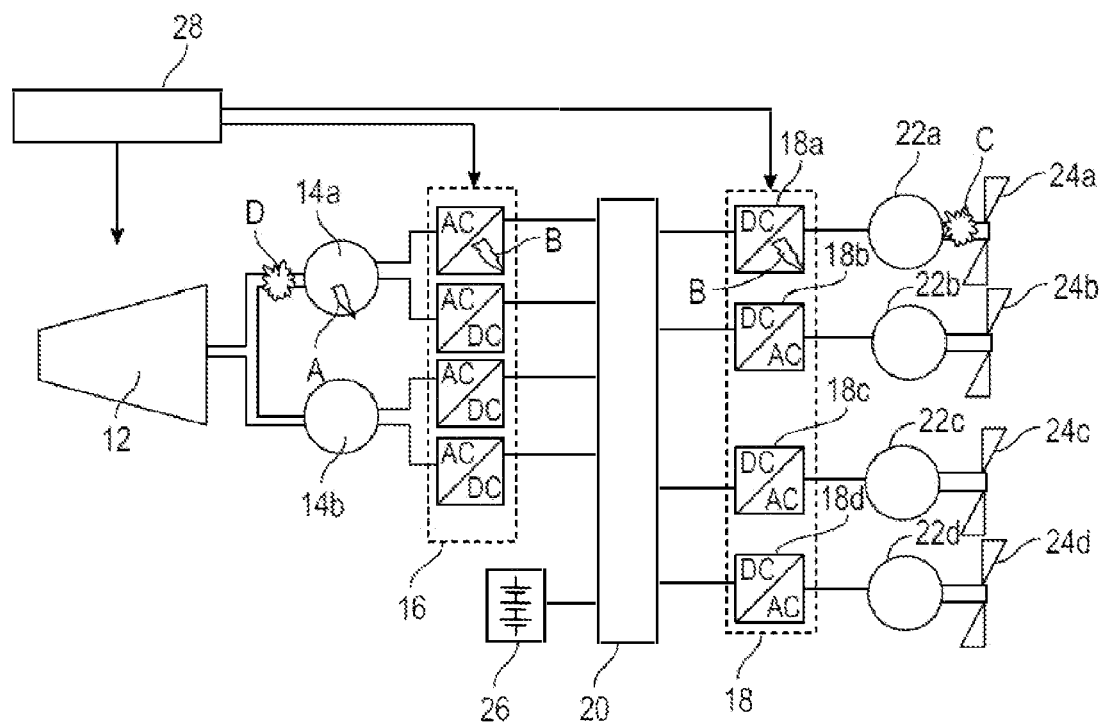
[Fig. 2]
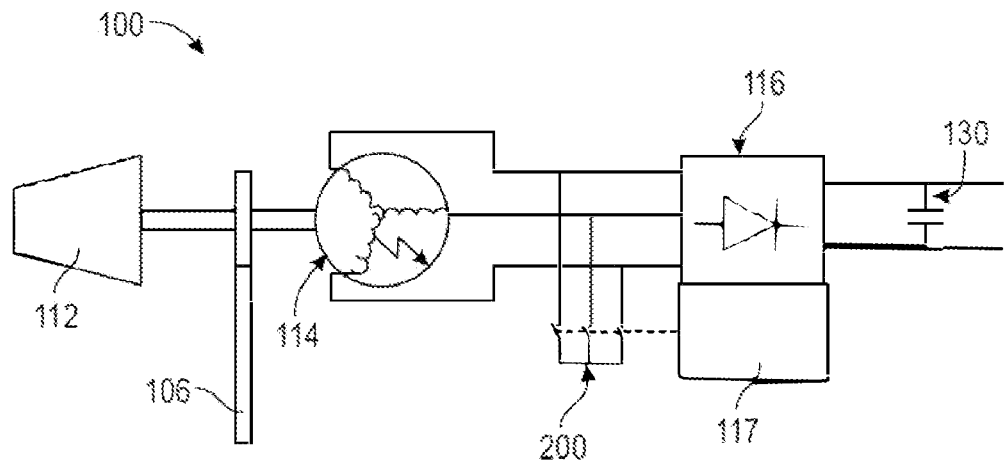

[Fig. 3]
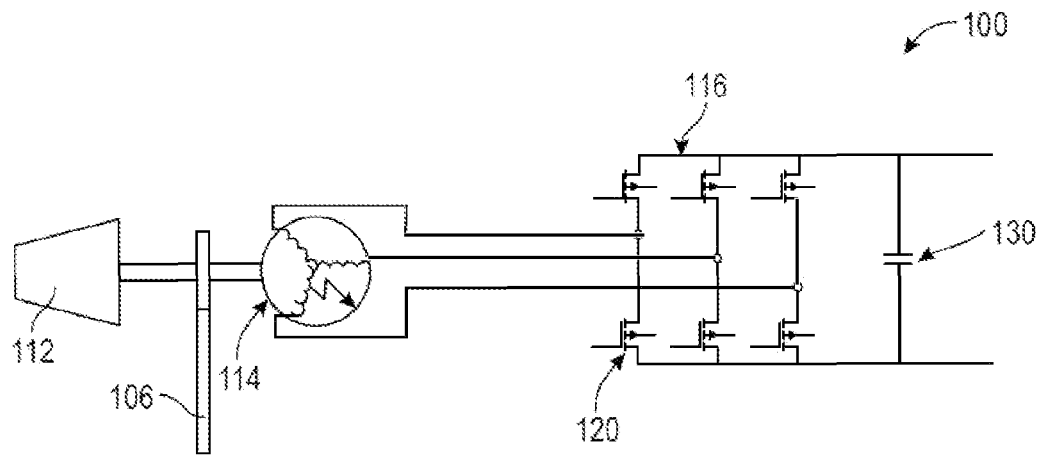
[Fig. 4]
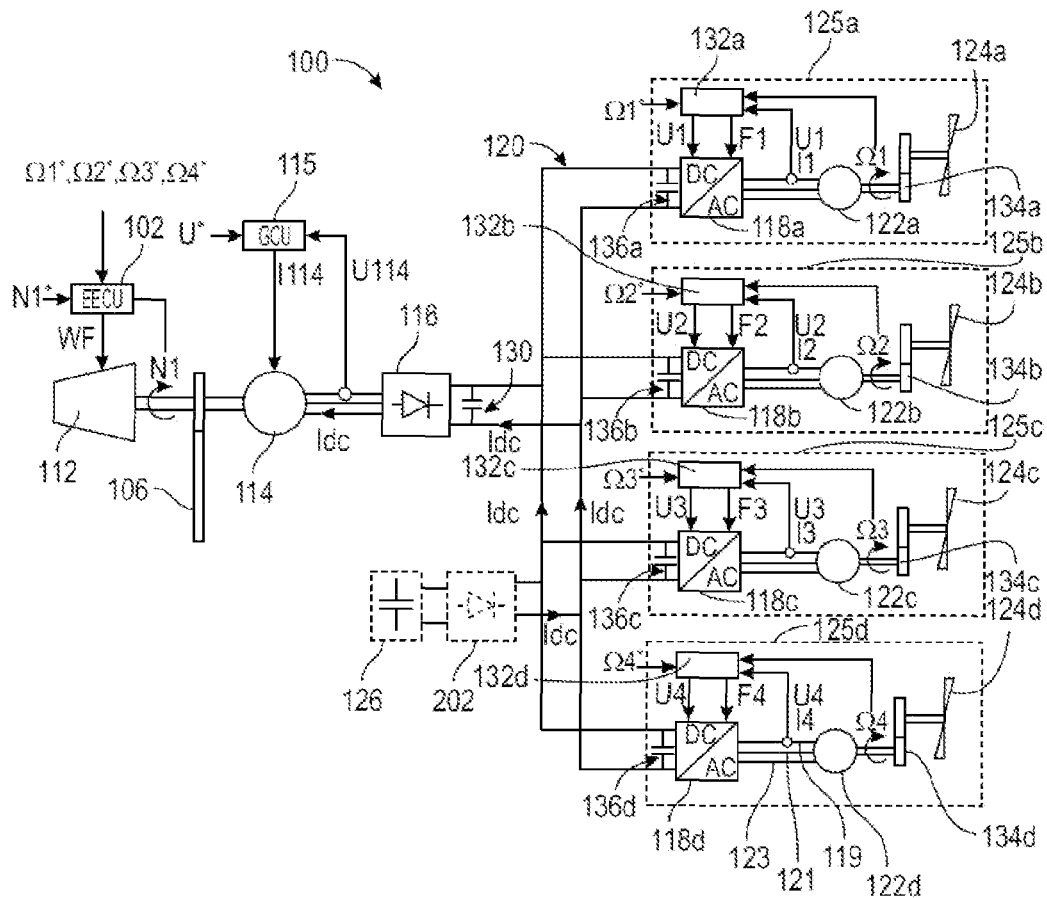

[Fig. 5]
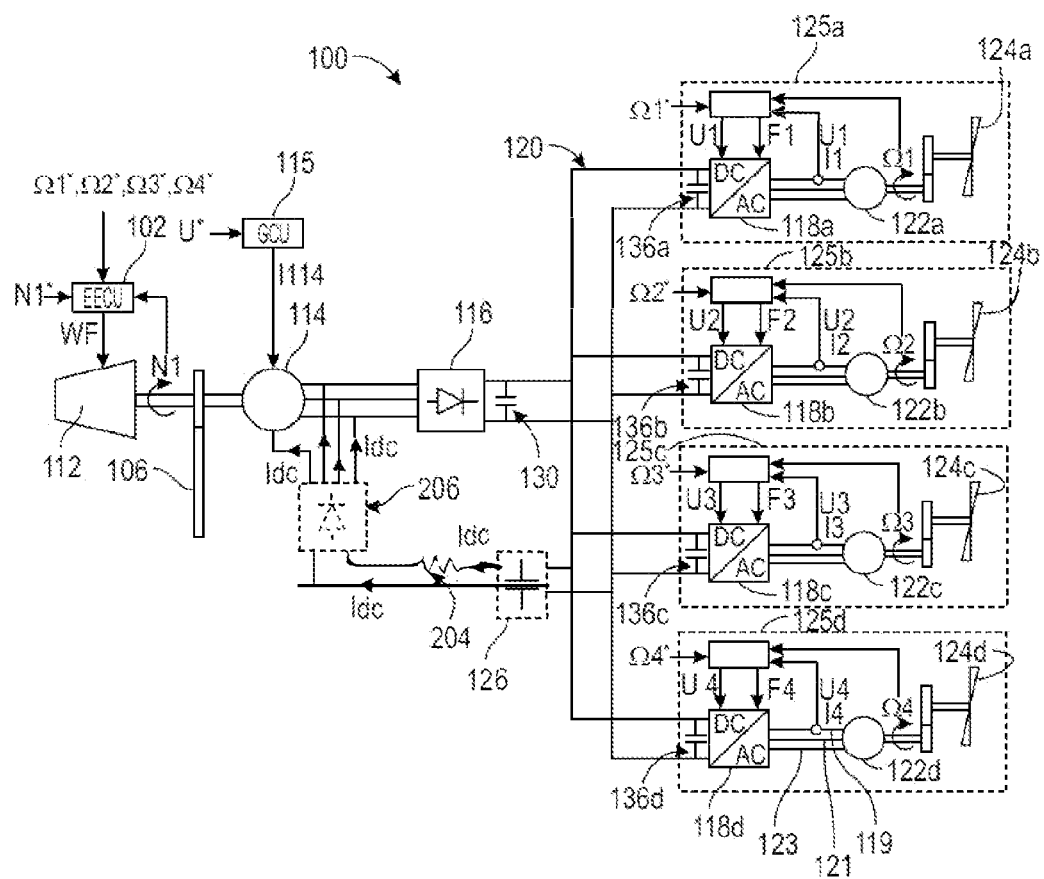

HYBRID PROPULSION SYSTEM AND METHOD FOR CONTROLLING SUCH A SYSTEM

TECHNICAL FIELD OF THE INVENTION

The invention relates to a hybrid propulsion system for a multi-rotor rotary wing aircraft, and to an aircraft comprising such a hybrid propulsion system.

BACKGROUND

The prior art comprises, in particular, the documents CA-A1-3 038 299, EP-A1-0 556 593 A1 and WO-A2-03/106828.

It is known from the prior art a hybrid power generation system of an aircraft, commonly called series hybridization, with a thermoelectric power generation.

As shown in FIG. 1, such a hybrid system typically comprises:
- an internal combustion engine 12, for example a gas turbine,
- at least one electric machine, for example an electric generator 14a, 14b, also referred to as electric generator, coupled to the internal combustion engine 12 so that in operation the internal combustion engine 12 drives the electric generator 14a, 14b,
- a power converter assembly named "rectifier" 16 connected to the electric generator 14a, 14b and configured to convert an alternative current delivered from the electric generator 14a, 14b into a direct current,
- means 18 for converting direct current into alternative current,
- an electrical network 20 connecting the rectifiers 16 to the conversion means 18,
- electric motors 22a, 22b, 22c, 22d connected to the conversion means 18a, 18b, 18c, 18d so that in operation the conversion means supply the electric motors with alternative current, and
- propellers 24a, 24b, 24c, 24d coupled to the electric motors 22a, 22b, 22c, 22d so that in operation the electric motors 22a, 22b, 22c, 22d drive the propellers 24a, 24b, 24c, 24d.

The gas turbine 12 comprises a free turbine mechanically connected to the electric generator 14a, 14b and drives the electric machine or the electric machines via mechanical transmission members.

In addition, the electrical network 20 typically comprises a high voltage direct current (HVDC) bus.

In such a system, from a source of fossil fuel, the internal combustion engine 12, and via a mechanical-electrical conversion, by the electric generator 14a, 14b, an electrical propulsion chain composed of the conversion means 18, the electric motors 22a, 22b, 22c, 22d and the propellers 24a, 24b, 24c, 24d, allows to make fly an aircraft with rotating multi-wings. The system comprises a storage unit 26 which has a reserve function for electrical energy. The storage unit 26 allows to ensure a redundancy in the supply of electrical energy in the event that the gas turbine becomes non-operational. In addition, the storage unit 26 can be used to stabilize the voltage of the HVDC bus, and thus maintain the controllability of the propellers 24a, 24b, 24c, 24d.

The system also comprises a regulator 28 configured to regulate the torque and the speed of the gas turbine 12, to ensure the control the rectifier assembly 16 and the conversion means 18, and thus to regulate the speed and the torque at the level of the propeller.

In some applications, a sudden reduction in the demand for electrical power, either voluntary or due to a fault, leads to a sudden increase in the speed of the rotor of the gas turbine, which in some cases can lead to an overspeed of this latter. The increase in speed is proportional to the level of decrease of the load.

However, the reaction time of the regulation of the gas turbines does not always allow the speed excursion to be kept below the value allowing to guarantee the integrity of the rotating mechanical pieces such as the turbine discs. This can then lead to a burst and the release of high energy debris. However, such an event is not tolerated in the aeronautical field.

In the case of a helicopter gas turbine, the main event of concern is the breakage of the transmission between the gas turbine and the main gearbox of the helicopter. This breakage causes a total drop in the resistive torque on the shaft of the turbine almost instantaneously.

In the case of an aircraft hybrid propulsion system, there can be multiple failure cases:
- loss of one or a plurality of windings of an electric machine 14a (illustrated by the arrow A in FIG. 1),
- complete loss of one or a plurality of electric machines 14a (illustrated by the arrow A in FIG. 1),
- loss, i.e. an open circuit, of one or a plurality of arms constituting the power electronic components, such as the rectifier 16, or the conversion means 18 called inverter (illustrated by the arrows B in FIG. 1),
- loss, i.e. an open circuit, of a consumer, such as a propeller 24a (illustrated by the element C in FIG. 1),
- breakage of the transmission between the gas turbine 12 and an electric generator 14a (illustrated by the element D in FIG. 1).

Under normal operating conditions, such a system is generally designed to avoid the sudden drops in the demand for power.

It is known to use a fuel regulation chain configured to respond to the speed excursion by metering the fuel so as to slow the rotor.

However, this fuel regulation chain is generally not sufficient to ensure that a reasonable speed is maintained for extreme cases, such as a total and instantaneous breakage of the transmission between a gas turbine and a receiver.

In addition, the fuel regulation chain does not have sufficient reaction time to allow to cover all cases of load decrease.

It is also known to use mechanical protection devices, such as blade-shedding, which consists of sizing the blades of gas turbines so that they break before the disc. This results in the generation of debris, but its energy is low enough to be contained in the engine. The gas turbine, thus deprived of its blades, can no longer retrieve the energy from the gases, which leads to a deceleration of the rotor.

However, the blade-shedding requires a precise mechanical sizing and a very advanced method control in order to demonstrate a reliable and repeatable breakage speed of the blades.

In addition, this device leads to the need of a shielding allowing to restrain the blades and the loss of the motor in the event of significant overspeed. Nevertheless, such a shielding induces an additional mass.

It is also known to use a protection device, called electronic overspeed protection device, configured to automatically stop the fuel supply, in a few tens of milliseconds, when the rotation speed of the rotor of the gas turbine exceeds a predetermined threshold.

However, the electronic overspeed cut-off is a threshold, which can only be set above the normal maximum operating speed of the gas turbine. As a result, the maximum speed reached is affected by the threshold of electronic overspeed cut-off and the instantaneous acceleration rate of the rotor of the gas turbine at the time the fuel supply is cut off.

Moreover, if the engine is not equipped with a blade-shedding device, this maximum speed reached determines the integrity speed to be demonstrated for the turbine discs, and therefore their mass.

SUMMARY OF THE INVENTION

The purpose of the invention is to propose a solution allowing to remedy at least some of these disadvantages.

In particular, the present invention proposes to reduce the magnitude of the speed excursion and thus allow the fuel metering the devices to respond.

For this purpose, the invention consists, in cases where at least one electric generator remains mechanically driven by the gas turbine, in using it to create an additional resistive load on the gas turbine.

To this end, the invention relates to a hybrid propulsion system for a multi-rotor rotary wing aircraft, comprising:
- an internal combustion engine, which may for example be a gas turbine with a bonded turbine, a free turbine or a piston engine,
- at least one electric machine coupled to the internal combustion engine so that in operation the internal combustion engine drives the electric machine,
- a rectifier connected to the electric machine and configured to convert an alternative current delivered from the electric machine into a direct current,
- means for converting direct current into alternative current,
- an electrical network connecting the rectifier to the conversion means,
- electric motors connected to the conversion means so that in operation the conversion means supply the electric motors with alternative current,
- propellers coupled to the electric motors so that in operation the electric motors drive the propellers, The system being characterized in that it comprises:
- detection means configured to detect a reduction in a demand for electrical power within the system below a predetermined value,
- short-circuit means configured to short-circuit the electric machine when the detection means detects a reduction in the demand for electrical power.

The system according to the invention allows to limit the overspeed excursion of the internal combustion engine, for example a gas turbine, in the event of a sudden drop in demand for the electrical power.

In fact, a reduction in demand for electrical power results in a reduction in the resistive torque exerted on the rotor of the gas turbine, and therefore an overspeed of the rotor of the gas turbine is observed. The short-circuit means allow the electric machine to be used to create an additional resistive load on the gas turbine. This advantageously allows the amplitude of the speed excursion to be reduced.

Advantageously, the detection means can detect any type of defects or drop in electrical power which must result in a braking to avoid the overspeed of the rotor of the gas turbine. Depending on the aircraft and the cases of power drop, this system allows to prevent the activation of mechanical or electronic overspeed protection devices that would lead to a loss of the turbine.

This system also allows to mechanically protect the electric machine or the electric machines, by limiting the overall speed excursion of the system, the latter generally accepting extreme maximum speeds lower than the gas turbines, in particular because of the technological constraints inherent in this type of electric machine.

This system also allows to smooth out the acceleration profiles in the cases of "normal" use.

The detection of a reduction in a demand for electrical power within the system can be achieved electronically.

According to one embodiment, the short-circuit means are arranged between the electric machine and the rectifier.

The short-circuit means may comprise a short-circuiting device.

The short-circuit means can be electromechanical or static.

According to another embodiment, the rectifier is active and comprises the short-circuit means.

The system may also comprise electrical energy storage means connected to the electrical network and configured to inject a direct current to the electric machine.

According to an embodiment, the electrical energy storage means is configured to inject a direct current directly to the electric machine.

The system may also comprise at least one ohmic conductor arranged between the electrical energy storage means and the electric machine.

The system may also comprise switching means arranged between the ohmic conductor and the electric machine.

According to another embodiment, the rectifier is reversible and configured to inject a direct current from the electrical energy storage means to the terminals of the electric machine. In other words, the electrical energy storage means are configured to inject a direct current to the electric machine indirectly.

The system may also comprise a boost chopper arranged between the electrical energy storage means and the rectifier.

The invention also relates to a multi-rotor rotary wing aircraft, comprising a hybrid propulsion system according to the invention.

The invention also relates to a method for controlling a hybrid propulsion system according to the invention, comprising the steps of:
- detecting a reduction in a demand for electrical power within the system below a predetermined value, and
- short-circuiting the electric machine in accordance with the detected reduction in the demand for electrical power within the system.

BRIEF DESCRIPTION OF FIGURES

The invention will be better understood and other details, characteristics and advantages of the present invention will become clearer from the following description made by way of non-limiting example and with reference to the attached drawings, in which:

FIG. 1 schematically represents a hybrid propulsion system according to the prior art, FIG. 2 schematically represents a part of a hybrid propulsion system according to an embodiment of the invention, FIG. 3 shows schematically a part of a hybrid propulsion system according to another embodiment of the invention, FIG. 4 shows schematically a hybrid propulsion system according to an embodiment of the invention, and FIG. 5 shows schematically a hybrid propulsion system according to another embodiment of the invention.

The elements having the same functions in the different embodiments have the same references in the figures.

DETAILED DESCRIPTION OF THE INVENTION

FIGS. 2 to 5 show a hybrid propulsion system 100 of an aircraft, for example of the helicopter or airplane type, with multi-rotor rotary wing according to the invention.

An internal combustion engine 112, such as a turbomachine, for example an Auxiliary Power Unit (APU), is coupled to an electric machine, for example an electric generator 114. The engine 112 may comprise a gas turbine. In operation, the electric generator 114 is driven by the engine 112.

The electric generator 114 may be a motor-generator, i.e., it may be capable of operating in both a generator mode, in particular when it is driven by the engine 112, and a motor mode. Thus, the electric generator 114 may be a reversible electric machine. The electric generator 114 allows to provide a bidirectional mechanical-to-electrical energy conversion, i.e., a mechanical-to-electrical conversion and an electrical-to-mechanical conversion. The electric generator 114 may generate a polyphase electrical current, for example a three-phase current as shown in FIGS. 2 and 5.

The engine 112 and the electric generator 114 provide a primary source of generation for the system 100. Although a single main generation source is shown in FIGS. 2 and 5, the system 100 may comprise a plurality of main generation sources.

The rotational speed N1 of the shaft of the rotor of the engine 112 connected to the electric generator 114 can be controlled by control means 102 (EECU, Electronic Engine Control Unit). These control means 102 may control parameters of the engine 112, such as the fuel weight flow, noted WF, on the basis of the rotation speed N1 and other parameters, such as the frequency N1* of the electric generator 114 or an anticipation of the load $\Omega1^*$, $\Omega2^*$, $\Omega3^*$, $\Omega4^*$ for each electrical propulsion chain.

The output voltage U114 of the electric generator 114 may be controlled by control means 115 (GCU, Generator Control Unit). These control means 115 are computers that contain a voltage regulator and a set of control and protection circuits that ensure a performance of the system under all conditions. The control means 115 may be equipped with analog or digital control electronics, depending on the needs of the system. These control means 115 may control parameters of the electrical generator 114, such as the current I114 of the electric generator, based on a voltage set point U* and the output voltage U114 of the electrical generator 114.

An auxiliary gearbox 106, typically a fixed ratio reduction gearbox or gear multiplier, may be arranged between the engine 112 and the electric generator 114 to adapt the speed level of the electric generator 114.

A rectifier 116 is connected to an input to the electric generator 114 and configured to convert the alternative current delivered by the electric generator 114 into a direct current. The rectifier 116 may be current reversible. The rectifier 116 may be an active rectifier. A capacitive element 130, such as a capacitor, may be arranged in parallel with the rectifier 116. An electrical network 120 connects in parallel an output of the rectifier 116 to inputs of conversion means 118a, 118b, 118c, 118d.

The conversion means 118a, 118b, 118c, 118d are configured to convert a direct current into an alternative current. The conversion means 118a, 118b, 118c, 118d may comprise direct current to alternative current converters.

The conversion means 118a, 118b, 118c, 118d may comprise inverters. In FIGS. 4 and 5, DC means direct current and AC means alternative current. Each inverter may comprise three inverter arms respectively delivering the three phases 119, 121, 123 (referenced only for the conversion means 118d) of alternative current to each of the electric motors 122a, 122b, 122c, 122d.

The conversion means 118a, 118b, 118c, 118d, and in particular the inverters, may be current reversible. A capacitive element 136a, 136b, 136c, 136d, for example a capacitor, may be arranged in parallel with each of the conversion means 118a, 118b, 118c, 118d.

The electrical network 120 may be bidirectional, that is, the electrical current may flow from the rectifier 116 to the conversion means 118a, 118b, 118c, 118d, and in the opposite direction.

Electric motors 122a, 122b, 122c, 122d are connected to the conversion means 118a, 118b, 118c, 118d. In operation, the electric motors 122a, 122b, 122c, 122d are supplied with alternative current by the conversion means 118a, 118b, 118c, 118d.

The electric motors 122a, 122b, 122c, 122d may be polyphase synchronous motors. These motors can be of different types, such as induction motors or variable reluctance motors. These motors can be of the single-stator or multi-rotor type. This advantageously allows to reduce the mass and the volume of the electric motors 122a, 122b, 122c, 122d.

The connection between the electric generator 114 and the electric motors 122a, 122b, 122c, 122d is operated in direct current, at a relatively high voltage, so as to improve the stability of the electrical network 120 and the power management. The rectifier 116 thus allows to ensure the conversion of the alternative current delivered by the electric generator 120 into direct current, while the conversion means 118a, 118b, 118c, 118d ensure the conversion of this direct current into alternative current intended for the electric motors 122a, 122b, 122c, 122d. Propellers 124a, 124b, 124c, 124d are coupled to the electric motors 122a, 122b, 122c, 122d. In operation, the propellers 124a, 124b, 124c, 124d are driven by the electric motors 122a, 122b, 122c, 122d. The propellers 124a, 124b, 124c, 124d may be coaxial counter-rotating propellers.

In particular, the conversion means 118a, respectively 118b, 118c, 118d, the electric motor 122a, respectively 122b, 122c, 122d, and the propeller or the propellers 124a, respectively 124b, 124c, 124d, form an electrical propulsion chain 125a, respectively 125b, 125c, 125d. In FIGS. 2 and 3, there are therefore four electrical propulsion chains 125a, 125b, 125c, 125d. For each electric propulsion chain 125a, 125b, 125c, 125d, the rotational speed $\Omega1$, $\Omega2$, $\Omega3$, 04 of the shaft connecting the electric motor 122a, 122b, 122c, 122d and the propellers 124a, 124b, 124c, 124d, via a gearbox, or more conventionally a fixed ratio reduction gearbox or a speed multiplier, 134a, 134b, 134c, 134d, may be controlled by control means 132a, 132b, 132c, 132d. Similarly, the voltage U1, U2, U3, U4 and the current I1, I2, I3, I4 from the conversion means 118a, 118b, 118c, 118d for supplying each electric motor 122a, 122b, 122c, 122d can be controlled by control means 132a, 132b, 132c, 132d. These control means 132a, 132b, 132c, 132d can control parameters of the conversion means 118a, 118b, 118c, 118d, such as the voltage U1, U2, U3, U4 of the electric motors 122a, 122b, 122c, 122d and the image frequency set points of the rotation speed, noted F1, F2, F3, F4, based on the rotational speed $\Omega1$, $\Omega2$, $\Omega3$, $\Omega4$ and the voltage U1, U2, U3, U4 and the current I1, I2, I3, I4 of the electric motors 122a, 122b, 122c, 122d, and other parameters, such as the anticipation of the load Ω1*, Ω2*, Ω3*, Ω4*.

Electrical energy storage means 126 are connected to the electrical network 120. These storage means 126 allow to absorb an excess of electrical energy from the HVDC bus of the electrical network 120. The storage means 126 may also be configured to temporarily supply the electric motors 122a, 122b, 122c, 122d by supplementing or substituting the electric generator 114.

The storage means 126 may be connected in parallel to the electrical network 120.

The storage means 126 may comprise one or a plurality of batteries, one or a plurality of capacitors, or one or a plurality of supercapacitors.

In the event of a loss of a winding of the electric generator 114, a complete loss of the electric generator 114, a loss of an arm of the rectifier 116 or conversion means 118a, 118b, 118b, 118d, a loss of a propeller 124a, 124b, 124c, 124d, or a breakage of the transmission between the gas turbine 112 and the electric generator 114, there is a drop in the demand for electrical power in the system 100. This reduction in the demand for electrical power results in a reduction of the resistive torque exerted on the rotor of the gas turbine 112, and thus an overspeed of the rotor of the gas turbine 112 is observed.

The present invention includes, in cases where the electric generator or the electric generators 114 remain mechanically driven by the gas turbine 112, i.e., the electrical generator or the electrical generators 114 are in a nominal operating state without failure, using it to create an additional resistive load on the gas turbine 112. This allows to reduce the amplitude of the speed excursion. In other words, the use of the electrical generator or these electrical generators 114 allows to create a sufficient resistive torque so that the gas turbine 112 does not overspeed.

In order to prevent an overspeed of the rotor of the gas turbine 112, the system 100 comprises detection means configured to detect a reduction in a demand for electrical power within the system below a predetermined value.

The detection of a reduction in a demand for electrical power within the system can be achieved electronically.

The system 100 also comprises short-circuit means 200 configured to short-circuit the electric machine, i.e. the electric generator 114, when a reduction in the demand for electrical power is detected by the detection means. In particular, the short-circuit means 200 may short-circuit the phase or the phases of the electrical generator 114 still mechanically linked to the gas turbine 112.

These short-circuit means, also referred to as short-circuiting device, thus allow a transient resistive torque to be created.

According to an embodiment shown in FIG. 2, the short-circuit means 200 are arranged between the electric generator 114 and the rectifier 116.

The short-circuit means 200 may be electromechanical or static.

The duration of the command to close the short-circuiting device 200 may be less than about ten milliseconds. In particular, the command may be sent through a communication channel with a high frequency range, i.e., in the order of MHz, via the control electronics 117 of the active rectifier 116 or by an electronic control unit (ECU).

The switching time of the short-circuiting device 200 can be less than 1 ms. For example, the short-circuiting device 200 may comprise a pyrotechnic switch, or a static component of the solid state power controllers (SSPC) type, or a thyristor.

According to another embodiment shown in FIG. 3, the rectifier 116 comprises the short-circuit means. In other words, if the current rating of the transistors of the rectifier 116 allows it, the active rectifier 116 acts as a short-circuiting device.

In order to have a greater resistive torque than the resistive torque produced by the short-circuit of the windings of an electric generator, an electromagnetic braking may be carried out by means of the rectifier 116.

This embodiment is shown in FIG. 4.

The rectifier 116 is reversible in current.

The storage means 126 are configured to inject a direct current to the electric generator 114. The rectifier 116 is configured to inject the direct current from the storage means 126 to the terminals of the electric generator 114. In other words, the storage means 126 are configured to inject a direct current to the electric generator 114 indirectly, i.e. via the rectifier 116. This is an electromagnetic braking with a change of quadrant of the rectifier 116.

In particular, the electromagnetic braking is carried out by injecting the direct current on the terminals of the stator windings, i.e. on the terminals of the stator, of the electric generator 114, thanks to the presence of the storage means 126 on the HVDC bus of the electrical network 120.

In FIG. 4, the direct current reinjection is represented by the arrows Idc.

The electric generator 114 then acts as an eddy current brake. The braking occurs over a short period of time, of the order of one second, which gives time to control the speed of the gas turbine 112. The thermal dissipation energy of the eddy currents in the stationary parts of the electric generator 114 are considered negligible, i.e., there is no need for an additional cooling of the electric generator 114.

The electric voltage at the terminals of the storage means 126 is greater than the electric voltage at the output of the electric generator 114. If this condition is not met, the system may comprise a chopper 202 of the boost type arranged between the storage means 126 and the rectifier 116.

FIG. 5 shows an alternative to the embodiment shown in FIG. 4.

In this variant, the storage means 126 is configured to inject a direct current directly to the phases of the electric generator 114. This is thus an electromagnetic braking with direct connection of the storage means 126 to the phases of the electric generator 114. This variant is advantageously less complex in its operation than the embodiment of FIG. 4.

In FIG. 5, the direct current reinjection is represented by the arrows Idc.

The system 100 may comprise at least one ohmic conductor 204, i.e., a resistor, arranged between the storage means 126 and the electric generator 114. In other words, the injection of direct current can take place through a resistor limiting the current, also called as a limiting resistor.

The system 100 may comprise switching means 206 arranged between the ohmic conductor 204 and the electric generator 114, and in particular fast switching means, i.e., with a response time of less than about 5 ms. For example, the switching means 206 may comprise a pyrotechnic switch, or a SSPC, or a thyristor.

When the electric voltage at the terminals of the storage means 126 is less than the electric phase voltage of the electric generator 114, the switching means 206 and the ohmic conductor 204 may be replaced by a boost chopper.

As shown in FIG. 5, four output terminals of the switching means 206 are connected to the electric generator 114 so as to return, at the winding node of the electric generator 114, the negative potential to the storage means 126.

The invention also relates to a method for controlling a system 100 as described above.

The method comprises a step of detecting a reduction in a demand for electrical power within the system 100 below a predetermined value. The detection can be achieved electronically. The detection of such a reduction may follow a loss of a winding or a complete loss of the electric generator 114, a loss of an arm of the rectifier 116 or conversion means 118a, 118b, 118b, 118d, a loss of a propeller 124a, 124b, 124c, 124d, or a breakage of the transmission between the gas turbine 112 and the electric generator 114.

Then, the method comprises a step of short-circuiting the electric generator 114 based on the detection of the reduction in the demand for electrical power within the system. Next, the method may comprise a step of injecting a direct current from the storage means 126 to the electric generator 114, either directly or via the rectifier 116.

The invention claimed is:

1. A hybrid propulsion system for a multi-rotor rotary wing aircraft, comprising:
   an internal combustion engine,
   at least one electric machine coupled to the internal combustion engine so that in operation the internal combustion engine drives the at least one electric machine,
   a rectifier connected to the electric machine and configured to convert an alternative current delivered from the electric machine into a direct current,
   means for converting direct current into alternative current,
   an electrical network connecting the rectifier to the conversion means,
   electric motors connected to the means for converting so that in operation the conversion means supply the electric motors with alternative current,
   propellers coupled to the electric motors so that in operation the electric motors drive the propellers,
   wherein the system comprises:
   detection means configured to detect a reduction in a demand for electrical power within the system below a predetermined value,
   short-circuit means configured to short-circuit the at least one electric machine when the detection means detects a reduction in the demand for electrical power.

2. The hybrid propulsion system according to claim 1, also comprising electrical energy storage means connected to the electrical network and configured to inject a direct current to the at least one electric machine.

3. The hybrid propulsion system according to claim 2, comprising at least one ohmic conductor arranged between the electrical energy storage means and the at least one electric machine.

4. The hybrid propulsion system according to claim 3, comprising switching means arranged between the at least one ohmic conductor and the at least one electric machine.

5. The hybrid propulsion system according to claim 2, wherein the rectifier is reversible and configured to inject a direct current from the electrical energy storage means to terminals of the at least one electric machine.

6. The hybrid propulsion system according to claim 5, comprising a boost chopper arranged between the electrical energy storage means and the rectifier.

7. The hybrid propulsion system according to claim 1, wherein the short-circuit means are arranged between the at least one electric machine and the rectifier.

8. The hybrid propulsion system according to claim 1, wherein the rectifier is active and comprises the short-circuit means.

9. A multi-rotor rotary wing aircraft, comprising a hybrid propulsion system according to claim 1.

10. A method for controlling a hybrid propulsion system according to claim 1, comprising the steps of:
    detecting a reduction in a demand for electrical power within the system below a predetermined value, and
    short-circuiting the at least one electric machine in accordance with the detected reduction in the demand for electrical power within the system.

11. The hybrid propulsion system according to claim 1, wherein the electric motors are polyphase synchronous motors.

12. The hybrid propulsion system according to claim 1, wherein the propellers are coaxial counter-rotating propellers.

13. The hybrid propulsion system according to claim 1, wherein the short-circuit means are configured to short-circuit a phase or phases of the at least one electric machine that are mechanically linked to the internal combustion engine.

14. The hybrid propulsion system according to claim 1, wherein the short-circuit means comprise a pyrotechnic switch, a static component of the solid state power controllers type or a thyristor.

* * * * *